(12) United States Patent
King

(10) Patent No.: US 9,161,525 B2
(45) Date of Patent: Oct. 20, 2015

(54) INSECT BAIT STAKE

(71) Applicant: WOODSTREAM CORPORATION, Lititz, PA (US)

(72) Inventor: Andrew N. King, Lititz, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 224 days.

(21) Appl. No.: 13/897,224

(22) Filed: May 17, 2013

(65) Prior Publication Data

US 2014/0338251 A1    Nov. 20, 2014

(51) Int. Cl.
*A01M 1/02* (2006.01)
*A01M 1/20* (2006.01)
*A01M 1/00* (2006.01)

(52) U.S. Cl.
CPC .............. *A01M 1/2011* (2013.01); *A01M 1/00* (2013.01); *A01M 1/02* (2013.01)

(58) Field of Classification Search
CPC .......... A01M 1/00; A01M 1/02; A01M 1/103
USPC .......................... 43/107, 121, 124, 131, 132.1
See application file for complete search history.

(56) References Cited

U.S. PATENT DOCUMENTS

| | | | |
|---|---|---|---|
| 2,547,314 A | 4/1951 | Grant | |
| 2,825,996 A | 3/1958 | Grant | |
| 2,893,160 A | 7/1959 | Grant | |
| 3,828,464 A | 8/1974 | Peace | |
| 4,065,872 A | 1/1978 | Patton et al. | |
| 4,485,582 A * | 12/1984 | Morris | 43/131 |
| 5,379,545 A | 1/1995 | Gall et al. | |
| 5,528,854 A | 6/1996 | Antonali et al. | |
| D400,635 S | 11/1998 | Kinzler et al. | |
| 5,870,853 A | 2/1999 | Williams | |
| 5,873,193 A * | 2/1999 | Jensen | 43/131 |
| 5,918,410 A * | 7/1999 | Knuppel | 43/131 |
| 6,016,625 A | 1/2000 | Bishoff et al. | |
| 6,085,942 A | 7/2000 | Redmond | |
| 6,219,961 B1 * | 4/2001 | Ballard et al. | 43/131 |
| 6,233,861 B1 | 5/2001 | DelVecchio | |
| 6,401,384 B1 * | 6/2002 | Contadini et al. | 43/132.1 |
| 6,474,015 B1 | 11/2002 | Lund et al. | |
| 6,796,082 B1 | 9/2004 | Duston et al. | |
| 7,540,111 B2 | 6/2009 | Kraatz | |
| 2005/0000148 A1 | 1/2005 | Kraatz | |

FOREIGN PATENT DOCUMENTS

| | | |
|---|---|---|
| JP | 2002-320437 | 11/2002 |
| JP | 2011-010629 | 1/2011 |

* cited by examiner

*Primary Examiner* — David Parsley
(74) *Attorney, Agent, or Firm* — Jacobson Holman, PLLC.

(57) ABSTRACT

An ant bait stake is provided having two components including an outer housing and an inner bait pack or reservoir that is separate from the outer housing. The outer housing has a main component and a minor component. The main component includes a bait pack compartment for receiving the bait pack, and a ground engaging stake. The minor component includes a door coupled along one edge to the bait pack compartment by a living hinge. The door and bait pack compartment include complementary structures that securely seal the bait pack compartment once the bait pack has been placed in the compartment and the door closed. A neck portion with an access channel to the bait pack therein has a break-away tab that extends outwardly of the housing, the tab being removable by the consumer without any tools or other devices when the ant bait stake is ready for use.

20 Claims, 13 Drawing Sheets

INSECT BAIT STAKE

BACKGROUND OF THE INVENTION

1. Field of the Invention

The present invention is related to the field of pest control and, more particularly, to a plastic insect bait assembly, especially for ants.

2. Description of the Related Art

Numerous types of bait stations have been developed for attracting and killing insects, through provision of a supply of bait, normally one that is doped with an insecticide, and facilitating the application of the station at a location where it will attract and kill insects through ingestion of the edible bait. More specifically, various types of bait stations, of the type as identified, have been available for some time for attracting roaches, ants, and other type of pests.

For example, an integrally molded insect or ant bait stake is disclosed in U.S. Pat. No. 7,540,111 to Kraatz ("the '111 patent"), which is commonly owned by the assignee of the instant application. The full disclosure of the '111 patent is hereby expressly incorporated by reference as if fully set forth herein.

The ant bait stake of Kraatz is made of two halves that are essentially a mirror image of one another. Each half has an upper reservoir part and a stake segment. When the two halves are sealed together along abutting edges, the two reservoir parts form a whole reservoir that is filled with insecticide. The stake segments are also adhered to one another along their abutting surfaces to form a layered or laminated stake. The bottom of the stake is driven into the ground while the top of the stake extends slightly above the reservoir to form a top edge. The top edge provides a narrow surface that can be impacted, as by a hammer, to drive the stake into the ground. To open the reservoir and provide ants with access to the insecticide contained therein, the user must cut off one corner of the top edge to create an access channel into the reservoir.

Because the two mirror image halves form the insecticide reservoir, the seal between the halves needs to be perfect. Therefore, any defect during manufacturing that allows for a leak between the halves results in the device being unusable and a potential for harmful contamination. Further, the top edge of the stake must be of adequate stiffness and strength to withstand hammering or other application of force to drive the device into the ground. As a result, the user must rely on a separate opening device, such as a knife or scissors, to cut open one corner of the top edge.

Therefore, a need exists for an insect or ant bait stake that overcomes the foregoing drawbacks.

SUMMARY OF THE INVENTION

In view of the foregoing, the present invention is directed to an insect or ant bait stake having two components including an outer housing and an inner bait pack or reservoir that is separate from the outer housing. The invention is most often described hereinafter as an ant bait stake; however, it is understood that other small insect pests may also be advantageously drawn to the bait stake. Therefore, use of the term "ant bait stake" herein is not intended to limit the present invention to use of the stake for ants only but is intended to encompass any small pest insect.

The outer housing has a main component and a minor component. The main component includes a bait pack compartment for receiving the bait pack, and a ground engaging stake that is integral with and extends below the bait pack compartment. The bait pack compartment includes a top plate having a flat upper surface and a bottom wall with a substantially flat bottom surface. The interior of the compartment receives the bait pack which has a stepped incline inside the bait pack to assist the ants in gaining access to the bait. The minor component includes a door coupled along one edge to the bait pack compartment of the main component by a living hinge. When the bait pack is positioned within the bait pack compartment, the door is pivoted on the living hinge and secured to the bait pack compartment of the main component to close off the bait pack compartment. Preferably the door includes an open slot or window which aligns with the stepped incline of the bait pack to allow the consumer to observe the ants climbing down and up the stepped incline of the bait pack.

The integral ground engaging stake extends below the bottom wall of the bait pack compartment and is configured as a V-shaped plate with a pointed tip to facilitate driving of the stake into the ground. The stake also includes ribs that extend generally perpendicular to the plate and increase the strength and buckling resistance of the stake. The top ends of the plate and ribs abut the bottom surface of the bait pack compartment bottom wall.

The flat upper surface of the top plate provides a stable surface for the consumer to push on when inserting the stake into the ground. The flat bottom surface of the bottom wall of the bait pack compartment acts as a positive stopping point for the depth of the stake when the stake is being inserted into the ground.

The bait pack compartment and the door include complementary structures that securely seal the bait pack compartment of the outer housing once the bait pack has been placed in the bait pack compartment and the door closed. Placement of the bait pack in the bait pack compartment is completed during manufacture so that the consumer does not have to undertake any assembly steps. The bait pack is preferably formed of clear or near-clear plastic and includes a neck portion with an access channel in the form of a break-away tab that extends outwardly of the side of the housing opposite the living hinge. By breaking off the tab, the access channel can be easily opened by the consumer without the need for any tools or other devices when the ant bait stake is ready for use. After the tab is removed, the outer edge of the reservoir neck portion protrudes only slightly from the side of the housing. When the insecticide in the ant bait stake has been consumed or the stake is made otherwise of limited effect, the consumer simply disposes of the entire ant bait stake as a unit.

Accordingly, it is an object of the present invention to provide an insect or ant bait stake having a two-piece design including an outer housing and a separate reservoir or bait pack that is fully sealed prior to use to prevent any inadvertent release of its contained insecticide while being easily opened without tools prior to use of the bait stake and being disposable together with the housing when the bait stake is empty or otherwise no longer useful.

Another object of the present invention is to provide a molded polymer insect or ant bait stake in accordance with the preceding object in which the housing has a flat top panel that provides a stable surface for the consumer to press against, such as by stepping on, to force the bait stake into the ground, and having reinforcing structures so as to add sufficient strength to the stake during installation thereof.

A further object of the present invention is to provide an insect or ant bait stake in accordance with the preceding objects that includes a bottom wall with a flat bottom surface on the lower side of the bait pack compartment of the outer housing which provides a positive stopping point for the insertion depth of the stake into the ground.

Yet another object of the present invention is to provide an insect or ant bait stake in accordance with the preceding objects which has a separate bait pack with a break-away tab extending outside the housing to enable the consumer to easily create an opening into the bait pack through which ants can enter and exit without the need for any tools.

A still further object of the present invention is to provide an insect or ant bait stake in accordance with the preceding objects that is fully assembled and sealed during manufacture and disposed of as a unit after use.

A further object of the present invention is to provide a uniquely shaped insect or ant bait stake in accordance with the preceding objects that has a separate clear or near-clear plastic bait pack configured with a stepped interior in which the steps serve as landing areas for the ants as they move into and through the bait pack or reservoir to attain access to its insecticide, and an opening or window in the outer housing that enables the consumer to see the ants moving on the stepped interior.

Still a further object of the present invention is to provide an insect or ant bait stake in accordance with the preceding objects having a bait pack that is created using a flat piece of material off of roll stock that is folded in half, scored and then being fed through heating, forming and cutting dies to create the bait pack.

Another object of the present invention is to provide an insect bait stake that is not complex in structure and which can be manufactured at low cost and efficiently constructed, while being easy to use and effective in controlling ants and other insects.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4-1 is an enlarged partial perspective view from the top plate side of the interior of the housing shown in FIG. 4.

FIG. 4-2 is an enlarged partial view from the bottom wall side of the interior of the housing shown in FIG. 4.

DETAILED DESCRIPTION OF THE PREFERRED EMBODIMENTS

Figure 1:
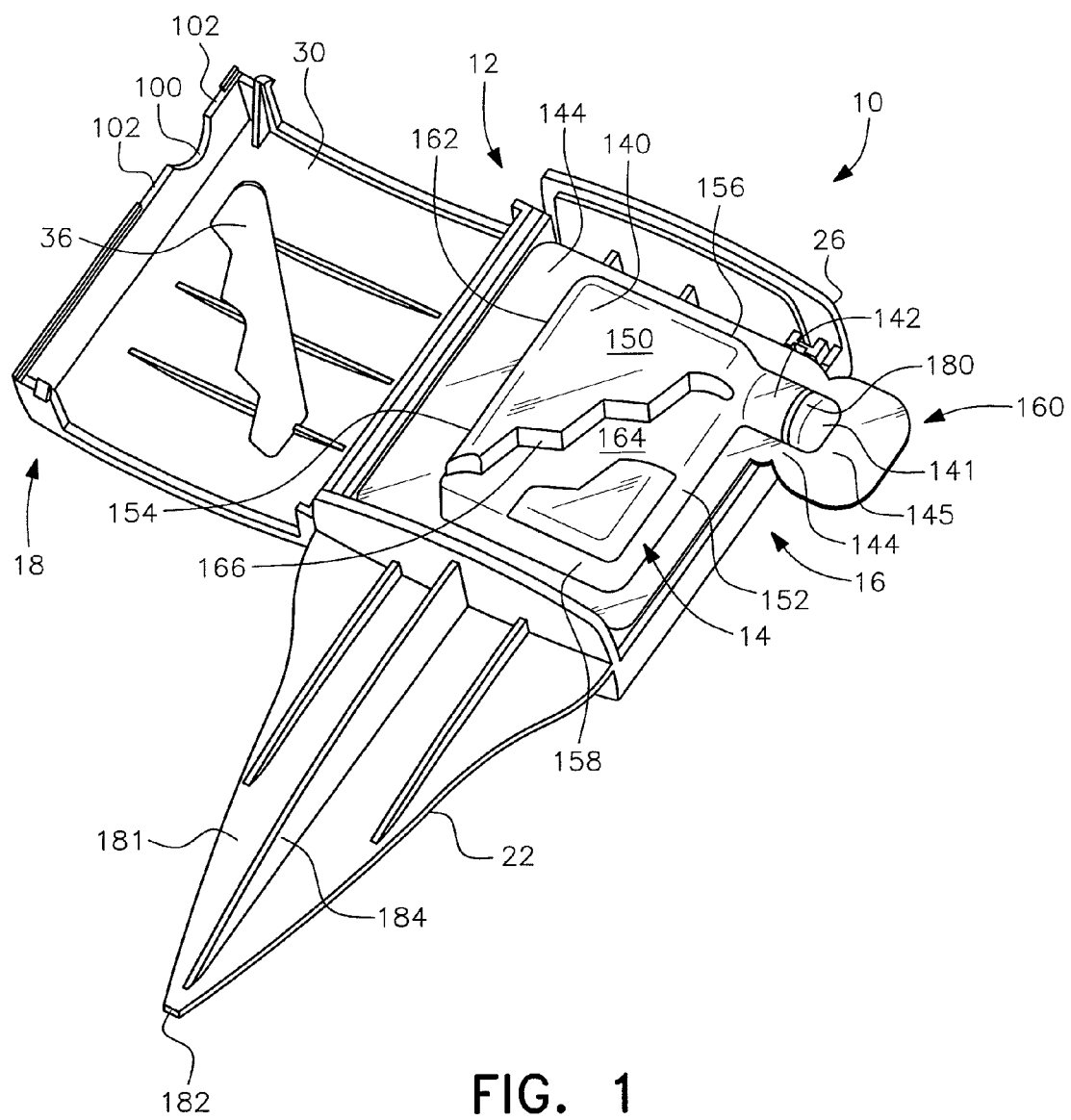
FIG. 1 is a bottom front perspective view of an ant and insect bait stake according to the present invention, showing the bait pack within the bait pack compartment of the outer housing prior to sealing of the bait pack compartment.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 2:
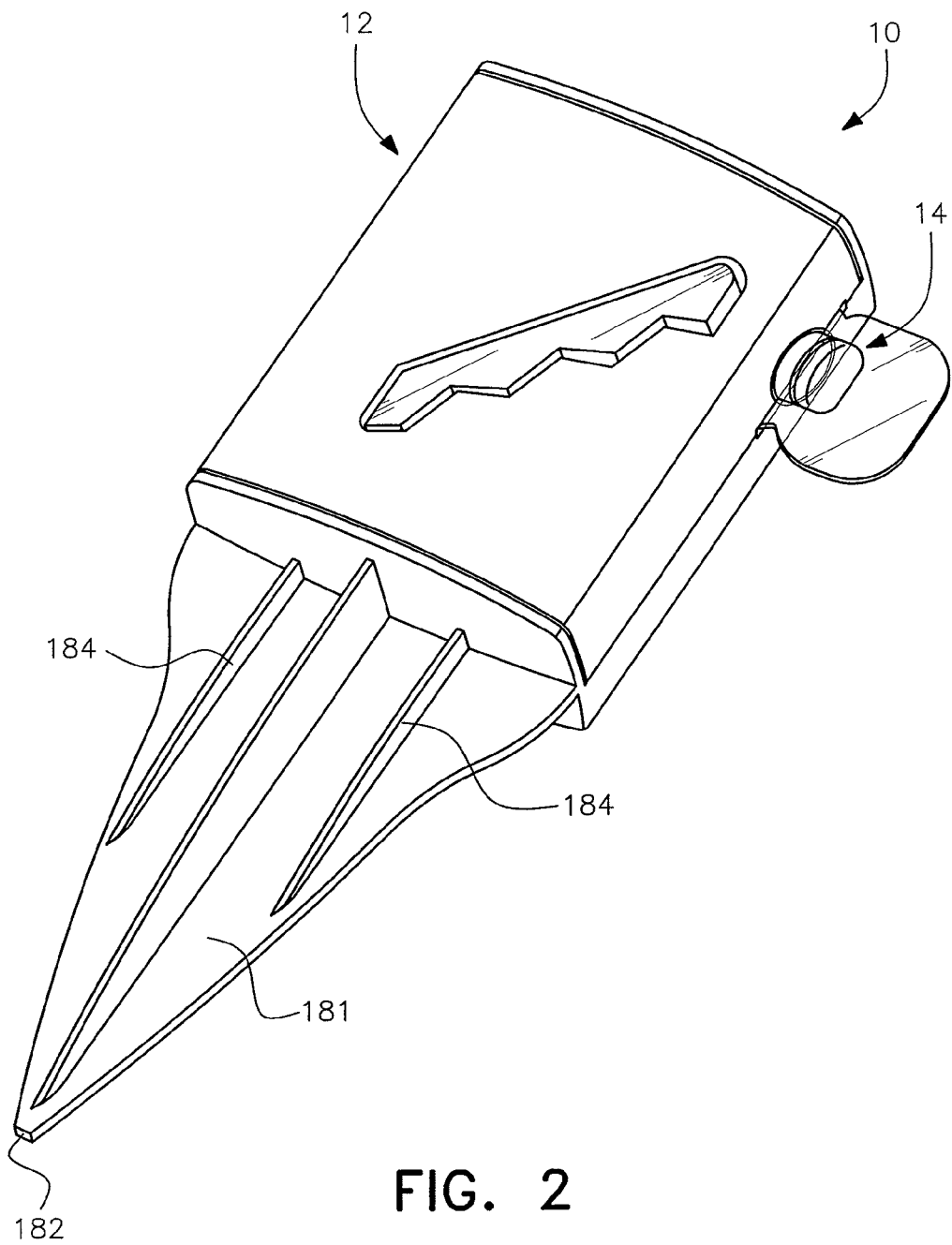
FIG. 2 is a bottom front perspective view of the ant and insect bait stake shown in FIG. 1 after sealing of the bait pack compartment.
Figure 3:
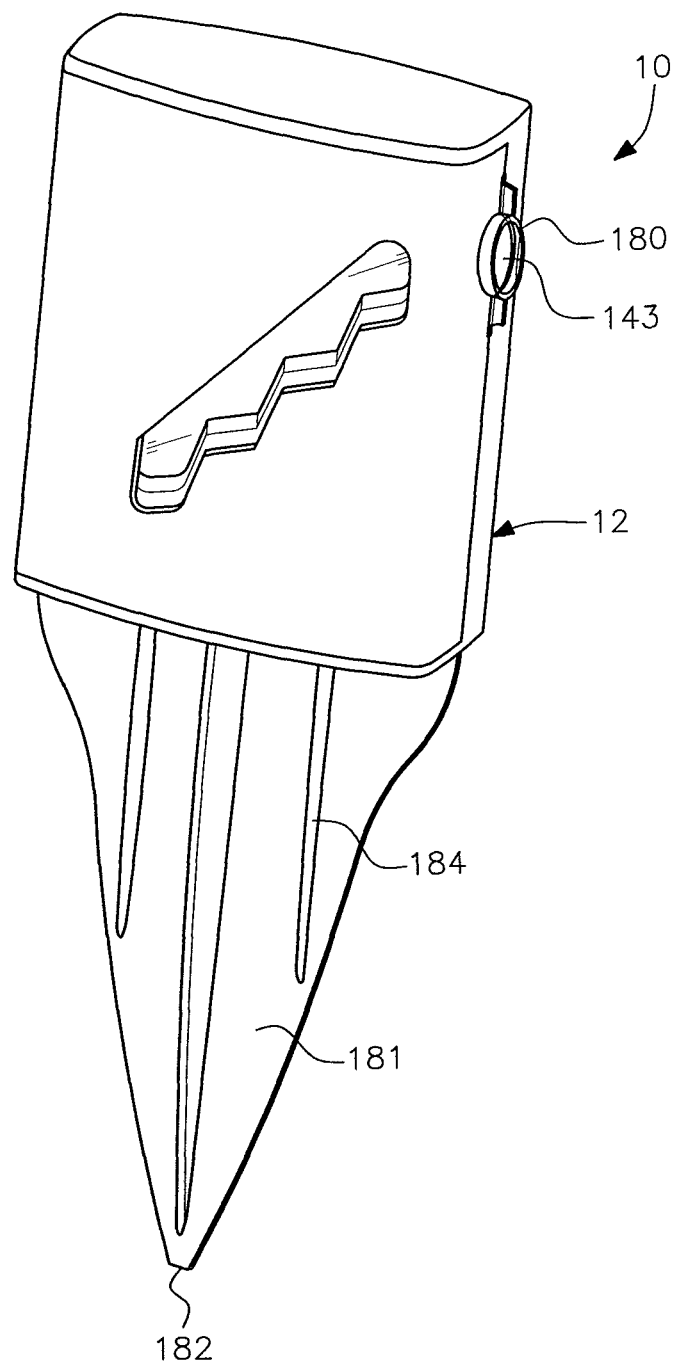
FIG. 3 is a top front perspective view of the sealed ant and insect bait stake shown in FIG. 2 after removal of the break-away tab to create an access channel into the bait pack or reservoir.

As shown in FIGS. 1-3, the present invention is directed to an ant and insect bait stake generally designated by reference numeral 10. The bait stake has two components including an outer housing generally designated by reference numeral 12 and an inner reservoir or bait pack generally designated by reference numeral 14 that is separate from the outer housing 12.

Figure 4:
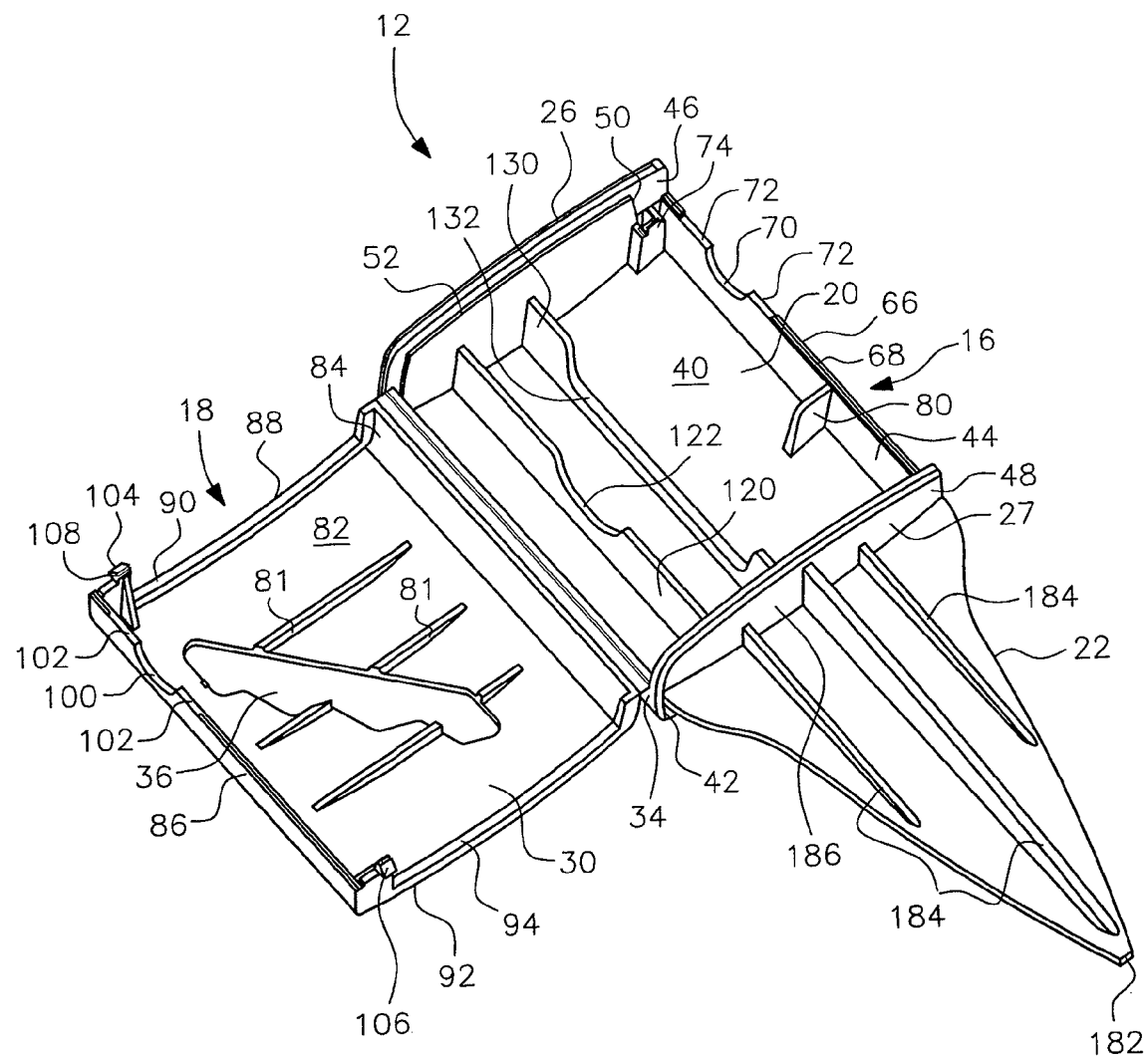
FIG. 4 is an upper perspective view of the housing of the ant and insect bait stake shown in FIG. 1, but without the bait pack.
Figures 1, 4:
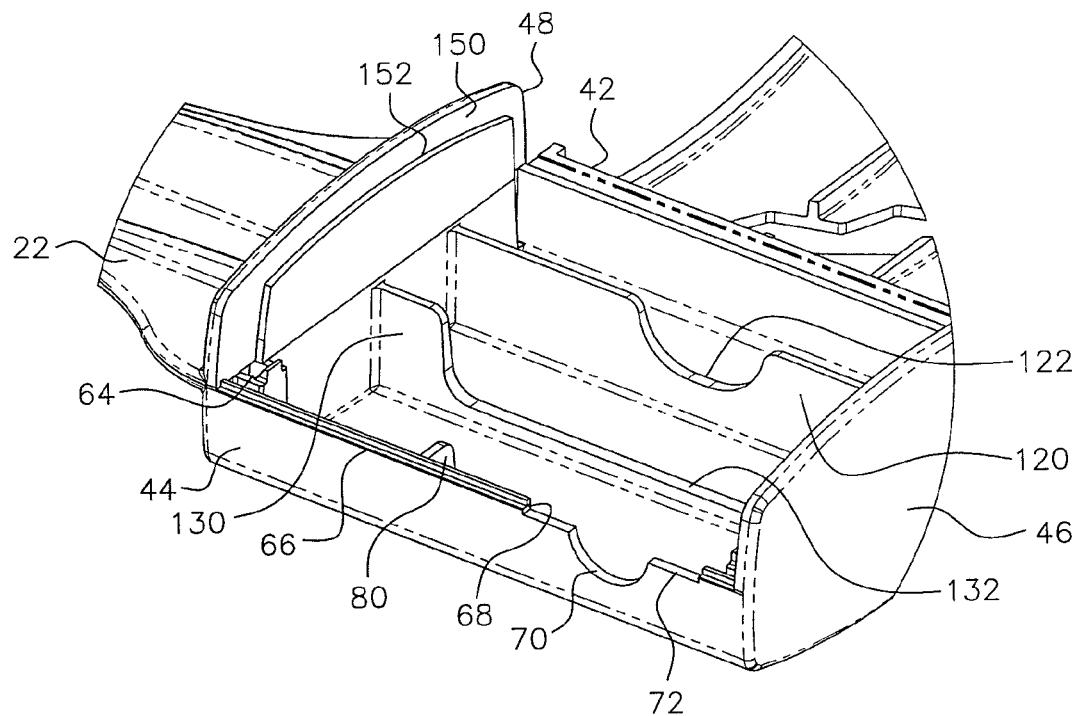
Figures 2, 4:
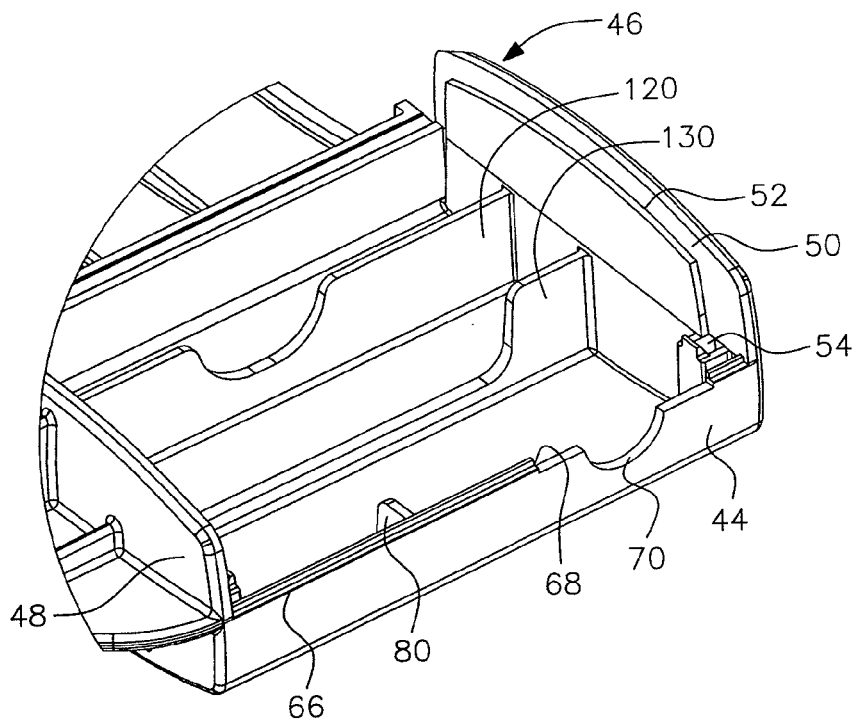

The outer housing 12, shown in isolation in FIG. 4, has a main component generally designated by reference numeral 16 and a minor component generally designated by reference numeral 18. The main component 16 includes a bait pack compartment 20 for receiving the bait pack 14, and a ground engaging stake 22 that is integral with and extends below the bait pack compartment 20. The top of the bait pack compartment includes a top plate 46 having a flat upper surface 26 and the bottom of the bait pack compartment is defined by a bottom wall 48 having a flat bottom surface 27.

The minor component 18 includes a door 30 coupled along one edge 32 to the bait pack compartment 20 of the main component 16 by a living hinge 34. When the bait pack 14 is positioned within the bait pack compartment 20 during manufacture, the door 30 is pivoted on the living hinge 34 and secured to the main compartment 16 to seal the bait pack compartment 20. Preferably the door 30 includes a window 36 which allows the consumer to observe the ants climbing down the stepped incline 28 formed in the bait pack 14 as will be described hereinafter.

The bait pack compartment 20 includes a primary outer wall 40, a first side outer wall 42, a second side outer wall 44, the top plate 46 and the bottom wall 48. The terms "first" and "second" are intended only for clarity as either side could be designated the first side outer wall or the second side outer wall.

The first and second side outer walls 42, 44 are generally parallel with one another and spaced from one another by the top plate 46 and the bottom wall 48. Similarly, the top plate 46 and bottom wall 48 are generally parallel with one another and spaced from one another by the first and second side outer walls 42, 44. The four outer walls are each generally perpendicular to the primary outer wall 40. The wall 40 may be flat but is preferably slightly curved so that the outer side of the wall 40 is convex.

As shown in the enlarged partial views of FIGS. 4-1 and 4-2, the top plate 46 includes a lip 50 that forms a shoulder 52 on the inner side of the top plate. The top plate 46 further includes an upper backing ledge 54 (see FIGS. 4-2, 7 and 8) formed adjacent the second side outer wall 44. The bottom wall 48 similarly includes a lip 150 that forms a shoulder 152 on the inner side of the bottom wall 48 (see FIG. 4-1), and further includes a lower backing ledge 64 formed adjacent the second side outer wall (see FIG. 7). The terms "upper" and "lower" refer to the positioning of the ledges relative to one another when the device is in use.

Figure 5:
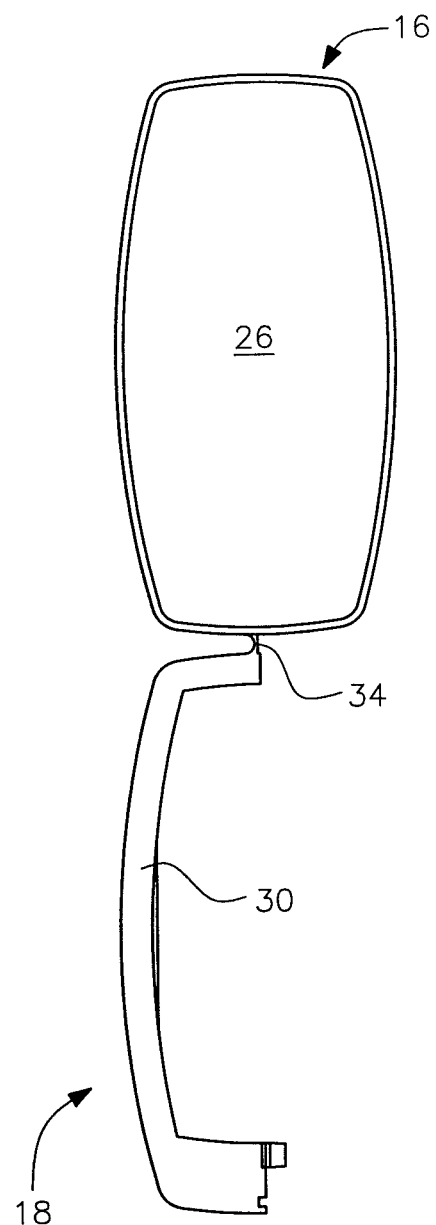
FIG. 5 is a top view of the housing shown in FIG. 4, illustrating the living hinge.
Figure 6A:
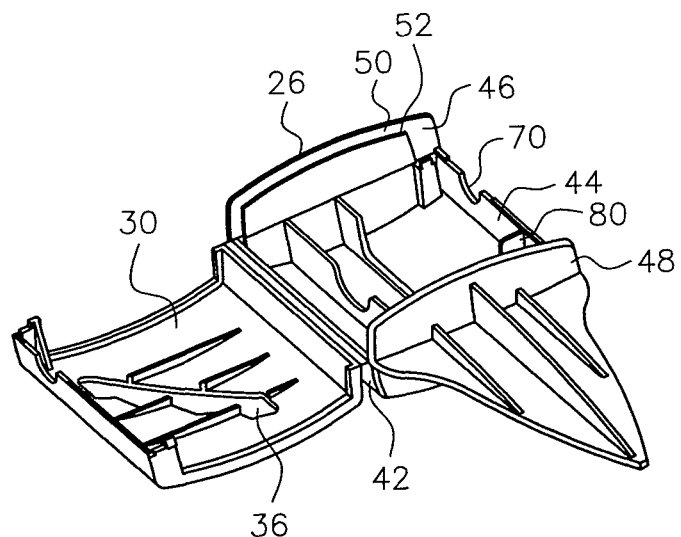
FIGS. 6A-6D are upper perspective views showing the process of closing the door to seal the bait pack compartment shown in FIG. 4.
Figure 6B:
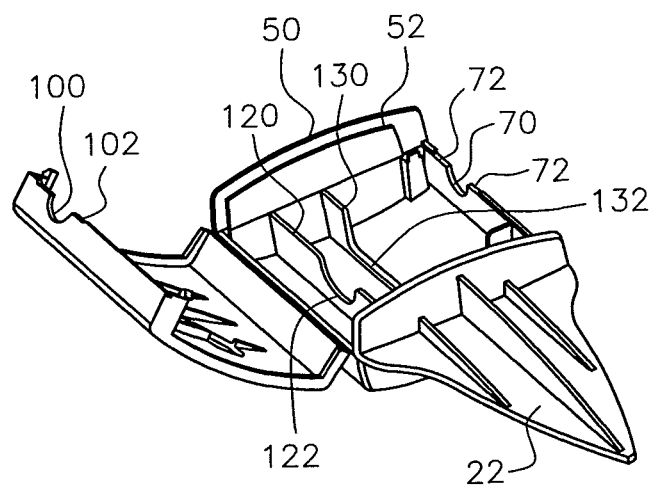
Figure 6C:
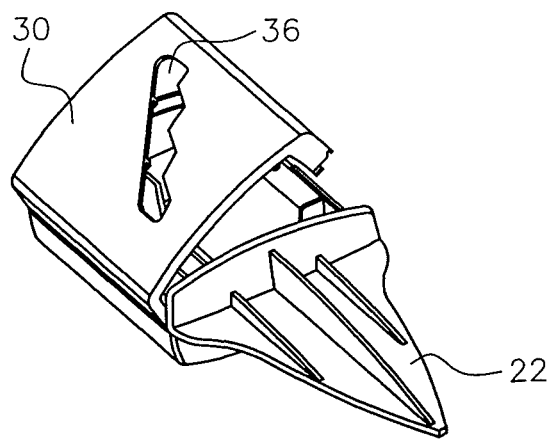
Figure 6D:
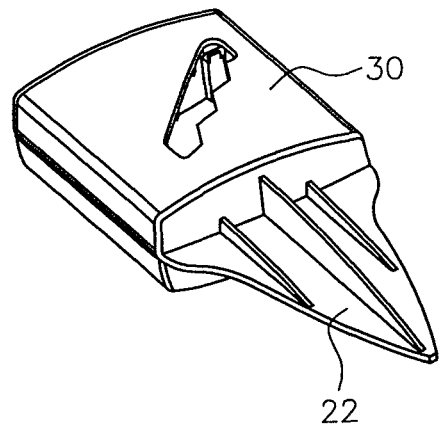

The first side outer wall 42 is coupled to the door 30 by the living hinge 34, best seen in FIG. 5. The living hinge 34 is preferably made of thinned polypropylene. The second side outer wall 44 has an upper edge 66 with a groove 68 that extends longitudinally along the edge (see FIGS. 4-1 and 4-2). The second side outer wall 44 also has a cutout 70 in proximity to the top plate 46. The cutout 70 is preferably semicircular. A generally rectangular cutout 72 is formed adjacent and on either side of the semicircular cutout.

Each end of the second side outer wall 44 has an upwardly projecting member 74 formed adjacent a respective one of the upper backing ledge 54 and the lower backing ledge 64. Each projecting member 74 is spaced from its respective backing ledge 54, 64 by a narrow channel 78 (see FIGS. 7-8). The second side outer wall also has an inwardly directed tab 80 that is generally perpendicular to the second side outer wall and inwardly spaced from the ends thereof.

The door 30 has a primary door panel 82, a first door side panel 84 and a second door side panel 86. The first and second door side panels 84, 86 are generally parallel with one another and separated by the primary door panel 82. The primary door panel 82 may be flat but is preferably slightly curved so that an outer side of the primary door panel is convex. Preferably, the inner surface of the primary door panel 82 has ridges 81 that assist in locating the bait pack and also strengthen the door. As with the bait pack compartment walls, the terms "first" and "second" may be assigned to either side panel. However, having identified the first and second bait pack compartment walls in the manner discussed above, the first and second door side panels have been designated as set forth herein in order for their positioning to correspond with the first and second side outer walls 42, 44. Further, as used hereinafter with respect to other components, the terms "first" and "second" are similarly assigned to correspond in position with other elements already so defined.

The primary door panel 82 has an upper edge 88 with an upper ledge 90 and a lower edge 92 with a lower ledge 94. As previously noted, the terms "upper" and "lower" refer to the positioning of the edges and their respective ledges relative to one another when the device is in use. The upper ledge 90 of the primary door panel 82 comes into abutment with the shoulder 52 on the inner side of the top plate 46 of the bait pack compartment 20 when the door is closed, thereby preventing the door from being pushed in. In a similar manner, the lower ledge 94 of the primary door panel comes into abutment with the shoulder (not shown) on the inner side of the bottom wall 48 of the bait pack compartment when the door is closed. The upper and lower edges 88, 92 are generally parallel with one another.

The first door side panel 84 is coupled to the first side outer wall 42 of the bait pack compartment 20 by the living hinge 34. The second door side panel 86 has a door cutout 100 in proximity to the upper edge 88 of the primary door panel 82. The door cutout 100 is preferably semicircular. A generally rectangular door cutout 102 is formed adjacent and on either side of the semicircular door cutout 100. The second door side panel 86 also has a first projecting clip 104 adjacent the upper edge 88 of the primary door panel and a second projecting clip 106 adjacent the lower edge 92 of the primary door panel. Each of the projecting clips 104, 106 has a hooked end 108.

Figure 7:
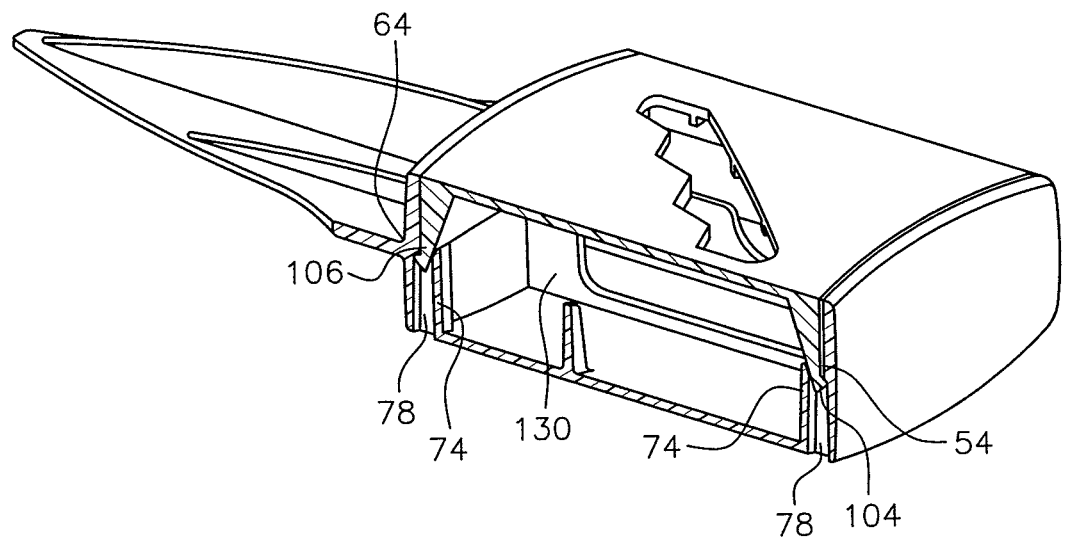
FIG. 7 is a side perspective, cutaway view of the housing shown in FIGS. 4 and 6A-6D, showing the clip and ledge structures used to lock the door against the bait pack compartment and seal the bait pack compartment.
Figure 8:
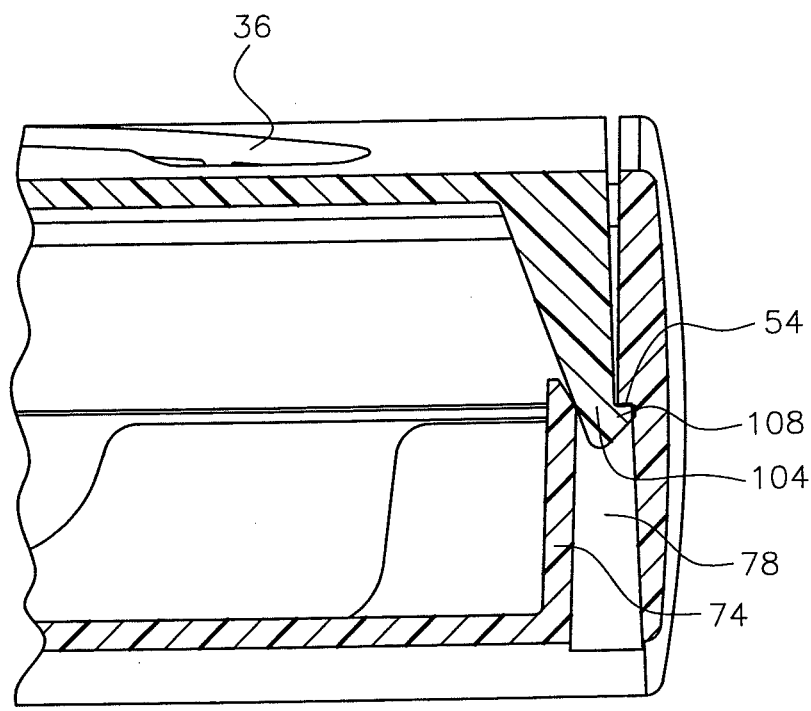
FIG. 8 is an enlarged cut-away side view of the clip and ledge structures shown in FIG. 7.

Closing of the door is illustrated in the sequence shown in FIGS. 6A-6D. Once closed, the projecting clips 104, 106 on the second door side panel 86 are respectively received within the narrow channels 78 formed between the projecting members 74 and the backing ledges 54, 64 as shown in FIGS. 7 and 8. The hooked ends 108 of the clips 104, 106 engage with the backing ledges 54, 64 with a "snap fit" to lock the door in the closed position. More particularly, the backing ledges force the clips into position and greatly increase the difficulty of opening the housing once the clips are engaged.

Extending inwardly from the inner side of the primary outer wall 40 of the bait pack compartment 20 are two bait pack locating ribs 120, 130 (see FIG. 4). The first bait pack locating rib 120 has a semicircular cutout 122 in the longitudinal center region thereof. The second bait pack locating rib 130 has an elongated, generally rectangular, longitudinally extending cutout 132. The two ribs 120, 130 are generally parallel with one another and perpendicular to the inwardly directed tab 80 on the second side outer wall 44.

Figure 9:
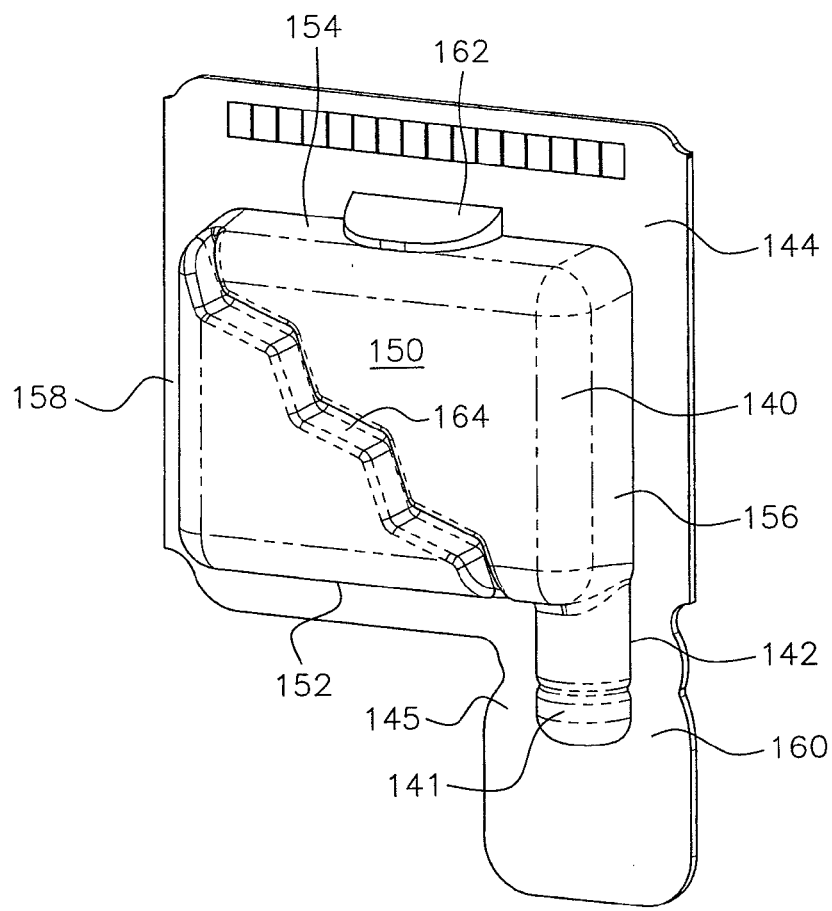
FIG. 9 is a side perspective view of the bait pack shown in FIG. 1.
Figure 10:
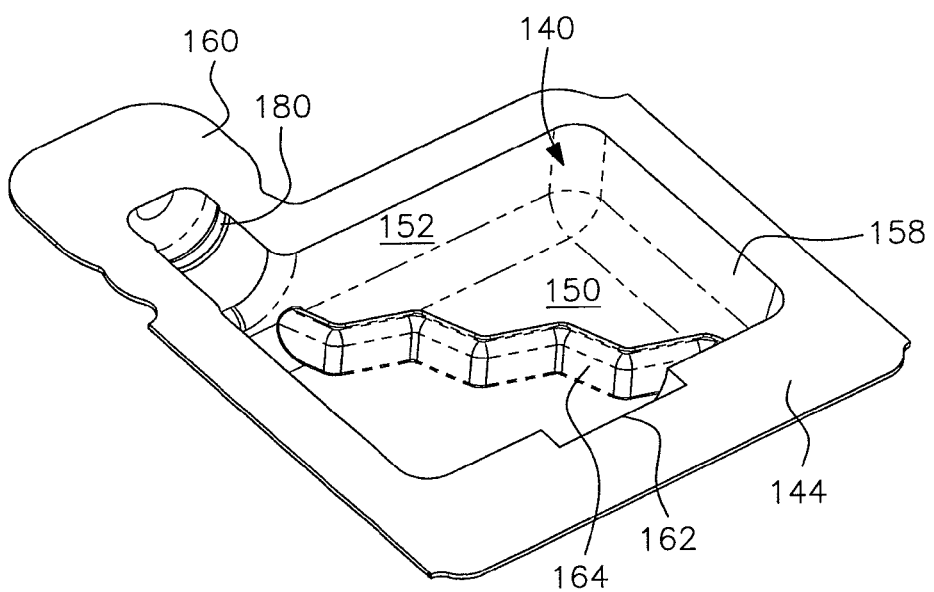
FIG. 10 is a perspective interior view of the well of one half of the bait pack shown in FIG. 9.
Figure 11:
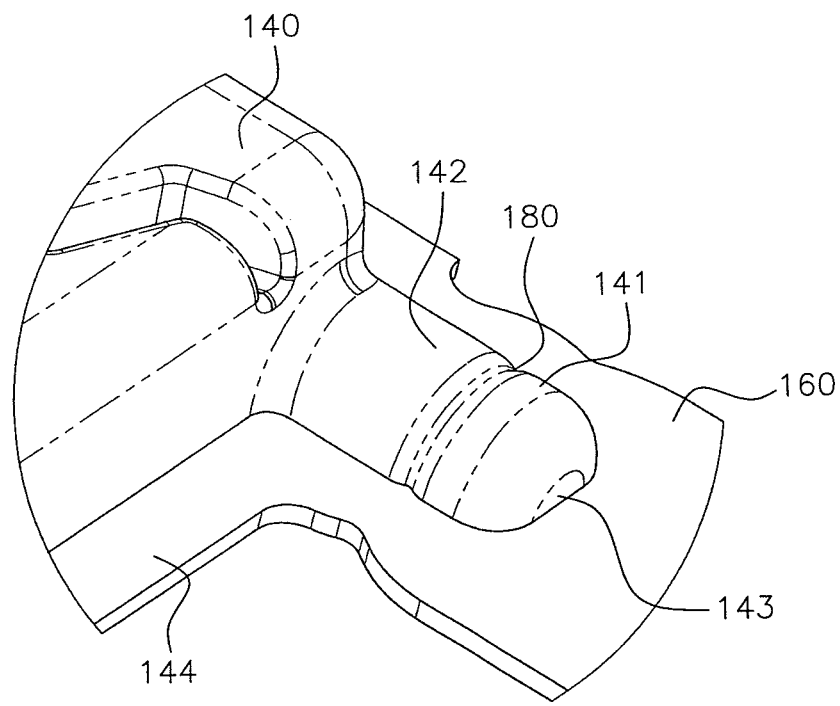
FIG. 11 is an enlarged partial view of the neck portion and break-away tab of the bait pack shown in FIG. 9.

As shown in FIGS. 9-11, the bait pack 14 is a separate component from the housing and is preferably formed to have two sides of clear or near-clear plastic that are essentially mirror images of one another. Each side of the bait pack includes an insecticide holding well 140, an outwardly projecting generally horizontal neck portion 142 defining an access channel 143 (see FIG. 3), a generally planar outer edge 144 that surrounds the well and the neck portion 142, and a stepped incline 164 projecting into the well. While both sides of the bait pack are preferably mirror images of one another, this correspondence is not required as it is only necessary that the two sides mate along their edges to form a sealed bait pack compartment as will be discussed more fully hereinafter.

When the two sides are sealed along their edges to form a single bait pack compartment, one of the bait pack halves constitutes an inner half and the other constitutes an outer half. As used herein the "inner" half is that side of the bait pack that is placed into abutment with the inner surface of the bait pack compartment, while the "outer" half is that side of the bait pack that is adjacent the door when the door is closed to seal the bait pack compartment 20.

The well 140 is generally rectangular and includes a primary wall 150, a first side wall 152, a second side wall 154, an upper wall 156 and a lower wall 158. The first and second side walls 152, 154 are generally parallel with one another and spaced from one another by the upper and lower walls 156, 158. Similarly, the upper and lower walls 156, 158 are generally parallel with one another and spaced from one another by the first and second side walls 152, 154. Each of the four walls is generally perpendicular to the primary wall 150. An interior view of the well 140 is shown in FIG. 10.

Figure 12A:
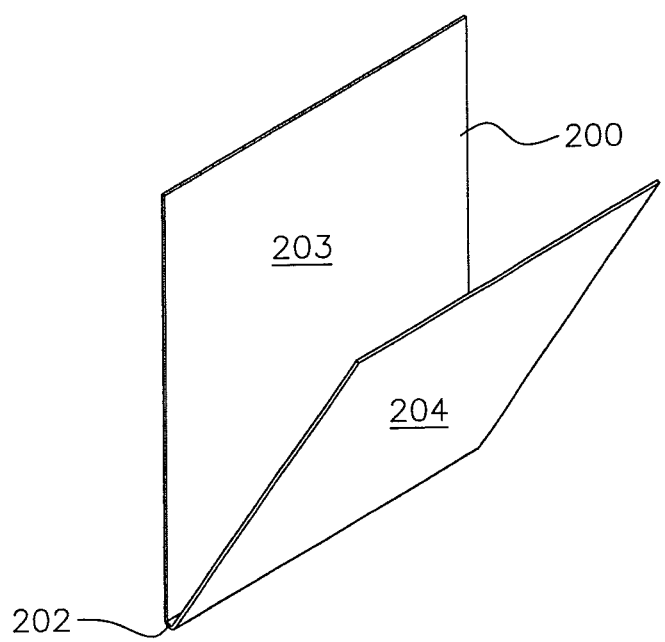
FIGS. 12A-12E show a sequence of manufacturing steps for production of the bait pack shown in FIG. 9.

According to one method of manufacture, the bait pack 14 is formed by folding a flat piece of film material 200 along a folding line 202 as shown in FIG. 12A to effectively create the two sides or halves 203, 204. The halves are then brought into abutment with one another and sealed to one another along a desired sealing line 210 that corresponds with the outer edges 144 of the bait pack. In particular, the sealing line 210 defines the well 140 and a break-away tab, generally designated by reference numeral 160, that surrounds the neck portion 142 and seals the access channel 143. A score 180 (see FIG. 11) is made in the neck portion of each half, by a process not shown, and before sealing of the halves. The score 180 facilitates breaking off of the break-away tab 160 as will be further discussed hereinafter.

Figure 12B:
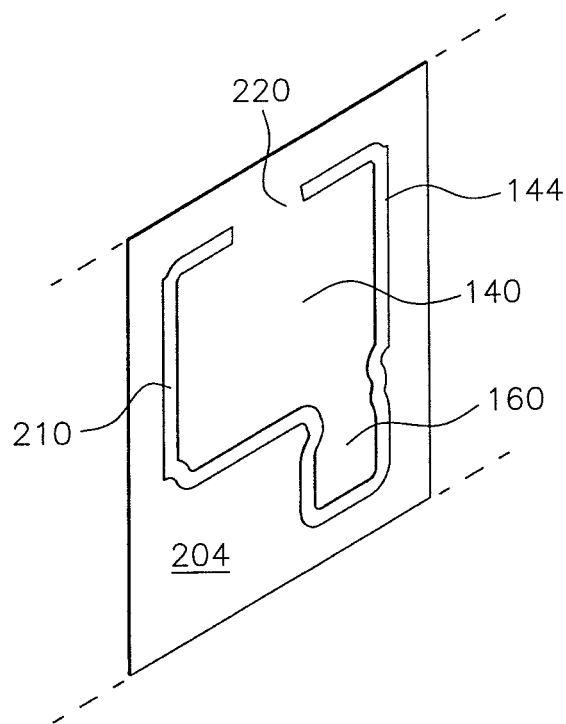
Figure 12C:
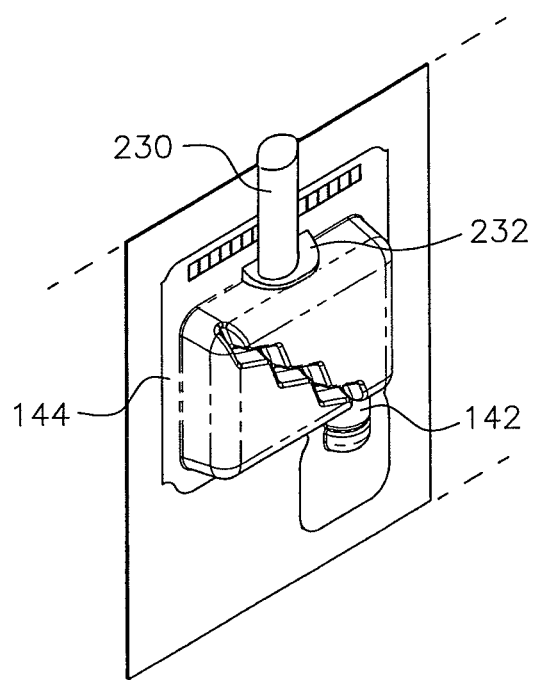
Figure 12D:
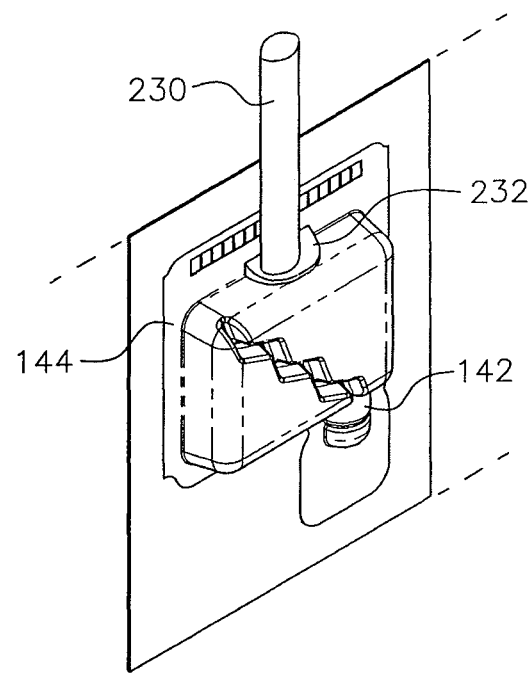
Figure 12E:
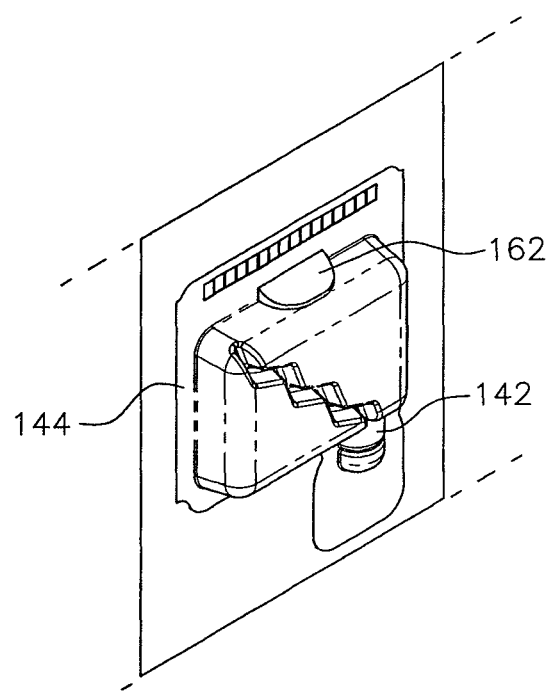

As shown in FIG. 12B, an opening is left in the sealing line to provide a fluid input channel 220. The central area surrounded by the sealed outer edges that will form the well 140 is also unsealed. The folded piece of film material 200 sealed along the sealing line 210 is then placed into a two-sided mold (not shown) that is pre-formed to create the desired bait pack shape including the inner contour of the well 140 as shown in FIG. 10. Air is injected through a tubular member 230 placed into the fluid input channel 220 as shown in FIGS. 12B and 12C. A flange 232 is formed around the tubular member 230 to ensure a tight seal around the tubular member. The air forces each half 203, 204 of the film material outwardly and into abutment with a respective inner side of the mold (not shown), forming a single sealed bait pack compartment 14 having the desired bait pack shape, including the well, neck portion, outer edge and break-away tab. Insecticide is then introduced into the well of the bait pack compartment through the tubular member 230 (see FIG. 12D), after which the tubular member is removed. The fluid input channel 220 and flange 232 are then sealed to leave a semi-circular projection 162 on the second side wall 154 as seen in FIG. 12E.

When the device is ready for use, the neck portion 142 projects from the first side wall 152 of the well 140 adjacent the corner formed by the intersection of the well first side wall 152 and the well upper wall 156 (see FIG. 2). An outer end 141 of the neck portion 142 and that portion 145 of the outer edge 144 surrounding the outer end 141 form the break-away tab 160 that protrudes outwardly from the first side wall 152. The break-away tab 160 provides an easy way for the consumer to open the access channel 143 into the bait pack without tools as will be described more fully hereinafter.

The semi-circular projection 162 on the outer surface of the second side wall 154, formed during manufacture as described above is received within the semicircular cutout 122 formed in the first bait pack locating rib 120. While the projection 162 is a by-product of the manufacturing process, necessitating the cutout 122 in the first bait pack locating rib 120, the projection in conjunction with the cutout may also serve to secure the positioning of the bait pack 14 within the bait pack compartment 20.

Since only the inner half of the bait pack is received within the bait pack compartment, the outer half of the bait pack may be constructed without the molded semi-circular projection, i.e., the outer half of the bait pack does not have to be a mirror image of the inner half. A bait pack having differently shaped sides would be produced using a different pre-formed mold as would be understood by persons of ordinary skill in the art. However, it is preferred that the two halves have identical structure for greater ease and simplicity in manufacture.

The pre-formed mold used to create the bait pack disclosed herein is shaped to form the stepped incline 164 of each half. After blow-molding of the bait pack, the stepped inclines 164 extend toward one another but do not extend fully across the interior of the wells so that there is a space between the two stepped inclines 164. The space is desirable to provide for manufacturing tolerances and also to prevent possible trapping of the bait as might occur if the inclines were in abutment with one another.

The stepped inclines 164 extend from the access channel 143 at the upper end of the first side wall 152, adjacent the well upper corner, downwardly to the lower wall 158 of the well adjacent the well corner that is diagonal to the well upper corner. The stepped inclines 164 make it easier for the ants to move from the access channel 143 in the neck portion 142 down into the bottom of the well 140 and then back up. The stepped inclines 164 also reduce the chances that the ants will drown which is desirable as it is intended that the worker ants consume the bait and then survive long enough to carry the liquid back to the nest and deliver a dose to the rest of the ant colony.

The stepped incline 164 in each half of the bait pack forms a correspondingly stepped recess 166 in the outer surface of the primary wall 150. The window 36 in the door 30 is preferably shaped to correspond with the stepped recess 166 in the primary wall 150 of the well 140, enabling the consumer to watch the ants as they move down and up the incline inside the well and/or to monitor a level of insecticide in the well. Because only the outer half of the bait pack is visible through the window 36 in the door 30, the primary wall 150 of the inner half of the bait pack may be constructed without the stepped recess 166, i.e., the outer half of the bait pack does not have to be a mirror image of the inner half. However, as already noted, it is preferred that the two halves have identical structure to simplify manufacture.

To place the bait pack in the bait pack compartment, the inner half of the bait pack is received within the bait pack compartment, while the outer half of the bait pack faces outwardly and will be adjacent the inner surface of the primary door panel 82 when the door is closed (see FIG. 1). With the bait pack in the bait pack compartment, the outer surface of the second side wall 154 of the lower half of the well is in abutment with the first bait pack locating rib 120, and the molded semi-circular projection 162 is received within the semicircular cutout 122 therein. Further, the primary wall 150 of the inner half of the well is received within the elongated cutout 132 in the second bait pack locating rib 130. In addition, the outer surface of the first side wall 152 of the inner half of the well 140 is in abutment with the tab 80 formed on the second side outer wall 44 of the bait pack compartment 20. Finally, the neck portion 142 of the inner half of the bait pack is received within the cutout 70 in the second side outer wall 44, while that portion 145 of the outer edge 144 of the bait pack that surrounds the channel outer end 141 of the neck portion 142 and access channel 143 is received within the generally rectangular cutouts 72 formed adjacent and on either side of the semicircular cutout 70 in the second side outer wall 44.

When the door is closed, the neck portion on the outer half of the bait pack is received within the door cutout 100 while that portion 145 of the outer edge 144 of the bait pack that surrounds the outer end 141 of the neck portion 142 is received within the generally rectangular cutouts 102 formed adjacent and on either side of the door cutout 100. The bait pack is thereby locked in position within the bait pack compartment.

When sealed prior to use, the break-away tab 160 extends outwardly from the side of the bait pack (see FIG. 1) and, when the bait pack is installed, also extends outwardly from the housing (see FIG. 2). As described above, the tab 160 is scored during manufacture to create a break line or score 180 (see FIG. 3). The tab may be removed by forcing the tab either all the way forward until broken or with a forward and back motion until broken. Removal of the tab activates the bait stake by opening the access channel 143 to allow insects to enter during use of the stake. FIG. 3 shows the ant and insect bait stake with the tab removed.

The integral ground engaging stake 22 extends below the bait pack compartment 20 and is configured as a V-shaped plate 181 with a pointed tip 182 to facilitate driving of the stake into the ground. The stake includes ribs 184 that are generally perpendicular to the plate 181 in order to increase the strength and buckling resistance of the stake 22. The top ends of the ribs abut the bottom wall 48 of the bait pack compartment 20. The bottom wall 48 of the bait pack compartment provides a flat surface 186 that acts as a positive stopping point for the depth of the stake when the stake is inserted into the ground. The flat upper surface 26 of the top plate 46 provides a stable surface for the consumer to push on when inserting the stake into the ground.

The two-part design of the ant and insect bait stake according to the present invention ensures that the bait pack, which is separate from the stake housing and enclosed therein, is fully sealed prior to use to prevent any inadvertent release of its contained insecticide. The break-away tab allows the consumer to easily open the bait pack without tools prior to use of the bait stake. After the bait is depleted, the housing and bait pack are easily and neatly disposed of as a unit.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An insect bait stake comprising an outer housing and a sealed inner bait pack that is separate from the outer housing, said outer housing having a main component and a minor component, the main component including a bait pack compartment for receiving the sealed inner bait pack, and a ground engaging stake that is integral with and extends below the bait pack compartment, said bait pack compartment including a top plate having a flat upper surface that provides a stable surface for the consumer to push on when inserting the stake into the ground and a bottom wall with a substantially flat bottom surface that provides a stop for limiting a depth to which the stake may be forced into a ground surface, said minor component including a door securable to said main component to close off the bait pack compartment after the sealed inner bait pack has been positioned within the bait pack compartment, said bait pack having a part that extends outwardly of the housing through an opening therein, said outwardly extending part including a break-away tab that is removable by the consumer to open the bait pack without any tools or other devices when the ant bait stake is ready for use.

2. The insect bait stake as set forth in claim 1, wherein an interior of the bait pack includes a stepped incline to assist the ants in gaining access to the bait.

3. The insect bait stake as set forth in claim 2, wherein at least an outer half of the bait pack is made of clear or near clear plastic and the door includes a window which allows the consumer to observe the ants climbing down and up the stepped incline in the bait pack.

4. The insect bait stake as set forth in claim 1, wherein the integral ground engaging stake extends below the bait pack compartment and is formed with a pointed tip to facilitate driving of the stake into the ground, said stake having ribs that extend generally perpendicular to the ground and increase the strength and buckling resistance of the stake, top ends of said ribs abutting a bottom wall of the compartment.

5. The insect bait stake as set forth in claim 1, wherein said door is coupled along one edge to the bait pack compartment by a living hinge, said door being pivoted on the living hinge to close the bait pack compartment.

6. The insect bait stake as set forth in claim 1, wherein the bait pack compartment and the door include complementary structures that securely seal the bait pack compartment once the bait pack has been placed in the bait pack compartment and the door closed.

7. The insect bait stake as set forth in claim 6, wherein said complementary structures include upwardly projecting members and backing ledges on the bait pack compartment, each projecting member being spaced from a respective backing ledge by a narrow channel, and projecting clips on the door that are respectively received within the narrow channels formed between the projecting members and the backing ledges, the clips having hooked ends that engage with the backing ledges with a snap fit to lock the door in a closed position against the bait pack compartment.

8. The insect bait stake as set forth in claim 1, wherein the bait pack compartment and the door include complementary structures that securely seal the bait pack compartment once the bait pack has been placed in the compartment and the door has been secured to the bait pack compartment in a closed position, said bait pack compartment and said door further including complementary structures that prevent the door from being pushed in beyond said closed position.

9. The insect bait stake as set forth in claim 8, wherein the bait pack compartment includes a primary outer wall, a first side outer wall, a second side outer wall, a top plate and a bottom wall, said first and second side outer walls being spaced from one another by the top plate and the bottom wall, said top plate and bottom wall being spaced from one another by the first and second side outer walls, said top plate including a lip that forms an upper shoulder on an inner side of the top plate, said bottom wall also including a lip that forms a lower shoulder on an inner side of the bottom wall, said door including a primary door panel having an upper edge with an upper ledge and a lower edge with a lower ledge, closure of said door bringing said upper ledge of the primary door panel into abutment with the upper shoulder on the inner side of the top plate of the bait pack compartment, and also bringing the lower ledge of the primary door panel into abutment with the lower shoulder on the inner side of the bottom wall of the bait pack compartment, engagement between said ledges and said shoulders preventing the door from being pushed in beyond the closed position.

10. The insect bait stake as set forth in claim 1, wherein the bait pack includes a well and said part of the bait pack that extends outwardly of the housing includes a neck portion with an access channel that extends outwardly from said well, said well being contained within said bait pack compartment and said neck portion extending outwardly from said compartment and through the opening in said outer housing when the bait stake is assembled and unopened, said break-away tab being located on the neck portion to open the access channel when the tab is removed.

11. The insect bait stake as set forth in claim 10, wherein said bait pack has a first half and a second half sealed to one another along an outer edge to form a sealed outer edge, said sealed outer edge being generally planar and extending outwardly from said well and said access channel and fully enclosing said well and said access channel.

12. The insect bait stake as set forth in claim 11, wherein the bait pack compartment includes a primary outer wall, a first side outer wall, a second side outer wall, a top plate and a bottom wall, said first and second side outer walls being spaced from one another by the upper and bottom walls, said upper and bottom walls being spaced from one another by the first and second side outer walls, said door having a primary door panel, a first door side panel and a second door side panel, said first door side panel being coupled to the first side outer wall of the bait pack compartment by a living hinge, said second side outer wall of the bait pack compartment having a first cutout, said second side door panel having a second cutout in alignment with said first cutout when the door is closed to form the opening in the outer housing, and said neck portion and access channel with said sealed outer edge passing through the outer housing opening formed by said first and second cutouts when the door is in a closed position.

13. The insect bait stake as set forth in claim 12, wherein said first cutout includes a first semicircular part and a first generally rectangular cutout formed adjacent and extending outwardly on either side of the first semicircular part of the first cutout, said second cutout including a second semicircular part and a second generally rectangular cutout formed adjacent and extending outwardly on either side of the second semicircular part of the second cutout, the neck portion and access channel being received within the outer housing opening formed by said aligned first and second semicircular parts of the first and second cutouts, and said sealed edge on either side of said access channel being received within said first and second generally rectangular cutouts.

14. The insect bait stake as set forth in claim 1, wherein an inner side of said bait pack compartment includes a first bait pack locating rib having a semicircular cutout in a longitudinal center region thereof, and a second bait pack locating rib spaced from said first bait pack locating rib and having an elongated, generally rectangular, longitudinally extending cutout, said first and second bait pack locating ribs being generally parallel with one another.

15. The insect bait stake as set forth in claim 14, wherein said bait pack includes a well outer half and a well inner half, said well inner half being received within said elongated, generally rectangular, longitudinally extending cutout in said second bait pack locating rib, said well outer half being adjacent an inner surface of the door when the door is in a closed position.

16. The insect bait stake as set forth in claim 15, wherein said bait pack well has a first well side wall and a second well side wall, said part of said bait pack that extends outwardly of said outer housing extending outwardly from said first well side wall, an outer surface of the second well side wall having a molded semi-circular projection that is received within the semicircular cutout formed in the first bait pack locating rib to secure the bait pack in position within the bait pack compartment of the outer housing.

17. The insect bait stake as set forth in claim 16, wherein said bait pack compartment includes a primary outer wall, a first side outer wall, a second side outer wall, a top plate and a bottom wall, said first side outer wall being connected to said door by a living hinge and said second side outer wall having an inwardly directed tab that extends generally perpendicular to said bait pack locating ribs, said first well side wall being in abutment with said tab to space the bait pack away from the second side outer wall of the bait pack compartment, said bait pack being prevented from moving toward either the first or second outer walls by the first bait pack locating rib and the tab, respectively.

18. An insect bait stake comprising an outer housing and an inner bait pack sealed separately from the outer housing, said outer housing having a main component and a minor component, the main component including a bait pack compartment for receiving the sealed inner bait pack, and a ground engaging stake that is integral with and extends below the bait pack compartment, said bait pack compartment including a top plate providing a stable surface for the consumer to push on when inserting the stake into the ground and a bottom wall that provides a stop for limiting a depth to which the stake may be forced into a ground surface, said minor component including a door securable to said main component to close off the bait pack compartment after the sealed inner bait pack has been positioned within the bait pack compartment, said bait pack having a well portion and a neck portion, said well portion forming a reservoir that is contained within the bait pack compartment and sealed separately from said bait pack compartment and said neck portion extending outwardly of the housing through an opening formed in said housing, said outwardly extending neck portion of said bait pack including a break-away tab located outside the housing that is removable by the consumer to open an access channel into the bait pack without any tools or other devices when the ant bait stake is ready for use.

19. The insect bait stake as set forth in claim 18, wherein the bait pack compartment includes a primary outer wall, a first side outer wall, a second side outer wall, a top plate and a bottom wall, said first and second side outer walls being spaced from one another by the upper and bottom walls, said upper and bottom walls being spaced from one another by the first and second side outer walls, said door having a primary door panel, a first door side panel and a second door side panel, said first door side panel being coupled to the first side outer wall of the bait pack compartment by a living hinge, said second side outer wall of the bait pack compartment having a first cutout, said second side door panel having a second cutout in alignment with said first cutout when the door is closed to form the opening in the outer housing, said bait pack having a first half and a second half sealed to one another along an outer edge to form a sealed outer edge, said sealed outer edge being generally planar and extending outwardly from said well and said access channel and fully enclosing said well and said access channel, and said neck portion and access channel with said sealed outer edge passing through the outer housing opening formed by said first and second cutouts when the door is in a closed position.

20. The insect bait stake as set forth in claim 19, wherein said first cutout includes a first semicircular part and a first generally rectangular cutout formed adjacent and extending outwardly on either side of the first semicircular part of the first cutout, said second cutout including a second semicircular part and a second generally rectangular cutout formed adjacent and extending outwardly on either side of the second semicircular part of the second cutout, the neck portion and access channel being received within the outer housing opening formed by said aligned first and second semicircular parts of the first and second cutouts, and said sealed edge on either side of said access channel being received within said first and second generally rectangular cutouts.

\* \* \* \* \*